United States Patent
Ho et al.

(10) Patent No.: US 10,879,978 B2
(45) Date of Patent: Dec. 29, 2020

(54) DIFFERENTIAL PHASE SHIFTER FOR HYBRID BEAMFORMING

(71) Applicant: Amphenol Antenna Solutions, Inc., Rockford, IL (US)

(72) Inventors: Jimmy Ho, Hickory, NC (US); Justin Riek, Taylorsville, NC (US)

(73) Assignee: Amphenol Antenna Solutions, Inc., Rockford, IL (US)

(*) Notice: Subject to any disclaimer, the term of this patent is extended or adjusted under 35 U.S.C. 154(b) by 0 days.

(21) Appl. No.: 16/277,429

(22) Filed: Feb. 15, 2019

(65) Prior Publication Data

US 2019/0268052 A1 Aug. 29, 2019

Related U.S. Application Data

(60) Provisional application No. 62/634,648, filed on Feb. 23, 2018.

(51) Int. Cl.
*H04B 7/06* (2006.01)
*H04B 7/0413* (2017.01)

(52) U.S. Cl.
CPC ........ *H04B 7/0617* (2013.01); *H04B 7/0413* (2013.01)

(58) Field of Classification Search
CPC .. H04B 7/0413; H04B 7/0617; H04B 7/0456; H04B 7/0417; H04B 7/0639
See application file for complete search history.

(56) References Cited

U.S. PATENT DOCUMENTS

| | | | | |
|---|---|---|---|---|
| 6,198,458 B1* | 3/2001 | Heinz | ............... | H01Q 1/125 343/757 |
| 6,714,096 B1* | 3/2004 | Broad | ............... | H01P 1/2138 333/110 |
| 6,850,130 B1 | 2/2005 | Gottl et al. | | |
| 8,130,161 B2* | 3/2012 | Arvidsson | ............ | H01Q 1/246 342/374 |
| 2008/0164076 A1* | 7/2008 | Orsley | ............... | G06F 3/044 178/18.01 |

(Continued)

FOREIGN PATENT DOCUMENTS

| WO | WO-9510862 A1 * | 4/1995 | ............ H01P 1/183 |
|---|---|---|---|
| WO | WO-99/59223 A2 | 11/1999 | |

OTHER PUBLICATIONS

I. Ahmed, "A Survey on Hybrid Beamforming Techniques in 5G: Architecture and System Model Perspectives", IEEE Communications Surveys & Tutorials, vol. 20, No. 4, Fourth Quarter 2018, pp. 3060-3097.

(Continued)

*Primary Examiner* — Shuwang Liu
*Assistant Examiner* — Gina M McKie
(74) *Attorney, Agent, or Firm* — Blank Rome LLP

(57) ABSTRACT

An arrangement and method for hybrid beamforming includes a differential phase shifter. The phase shifter has substantially parallel elongate conductive input and output radio frequency transmission lines. A movable transverse planar conductive coupling element configured to provide capacitive coupling between itself and the input and output lines. The coupling element is slideably movable along an axis of the said input and output transmission lines.

7 Claims, 18 Drawing Sheets

(56) References Cited

U.S. PATENT DOCUMENTS

| | | | | |
|---|---|---|---|---|
| 2008/0180190 | A1* | 7/2008 | Chan | H03H 7/18 |
| | | | | 333/118 |
| 2008/0252522 | A1* | 10/2008 | Asbridge | H01Q 21/061 |
| | | | | 342/368 |
| 2013/0214973 | A1* | 8/2013 | Veihl | H01Q 3/40 |
| | | | | 342/373 |
| 2013/0301454 | A1 | 11/2013 | Seol et al. | |
| 2016/0301121 | A1* | 10/2016 | Dandlberger | H01P 1/064 |
| 2017/0279187 | A1 | 9/2017 | Lockwood et al. | |

OTHER PUBLICATIONS

R. Gentile, "Hybrid Beamforming for 5G MIMO Arrays", EDN Network, Feb. 14, 2018: 3 pages.

Better Together. Design. Security. Collaboration.; www.fiercewireless.com/wireless/at-t-s-needlessly-messy-small-cell-highlights-5g-deployment-challenges, 2018; 5 pages.

G. Zucchelli, et al., "Hybrid-Beamforming Design for 5G Wireless Communications", http://elctronicdesign.com/pring/communications/hybrid-beamforming-d . . . . ; 2007. 10 pgs.

A. F. Molisch, et al. , "Hybrid Beamforming for Massive MIMO. A Survey", Radio Communications. IEEE Communications Magrazine, Sep. 2017, pp. 134-141.

"Fixed Radio Systems; Point-to-point equipment; Specific aspects of the spatial frequency reuse method", Technical Report; ETSI TR 102 311 V1.2.1 (Nov. 2015). http://www.etsi.org/standards-search; 45 pgs.

A. F. Molisch, et al., "Hybrid Beamforming for Massive MIMO—A Survey", IEEE Communications Magazine, vol. 55, No. 9, Sep. 2017.

* cited by examiner

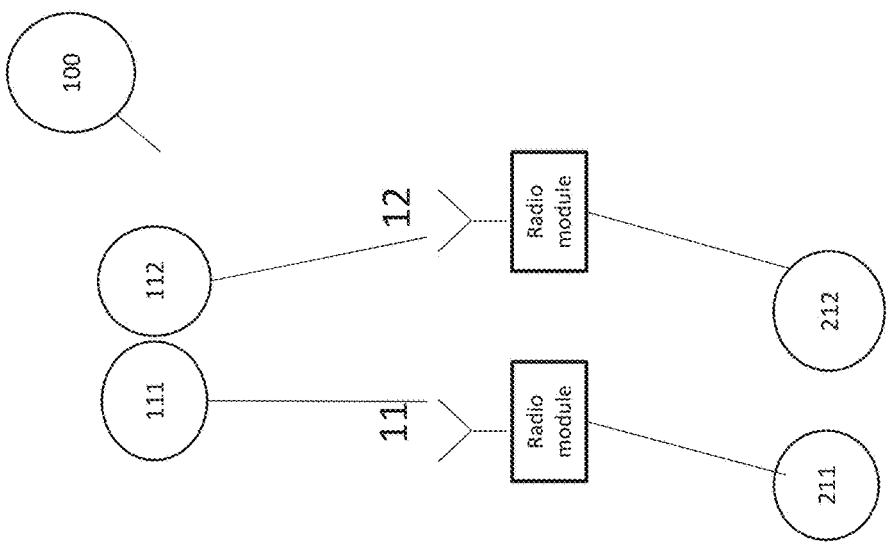
FIG. 3
PRIOR ART
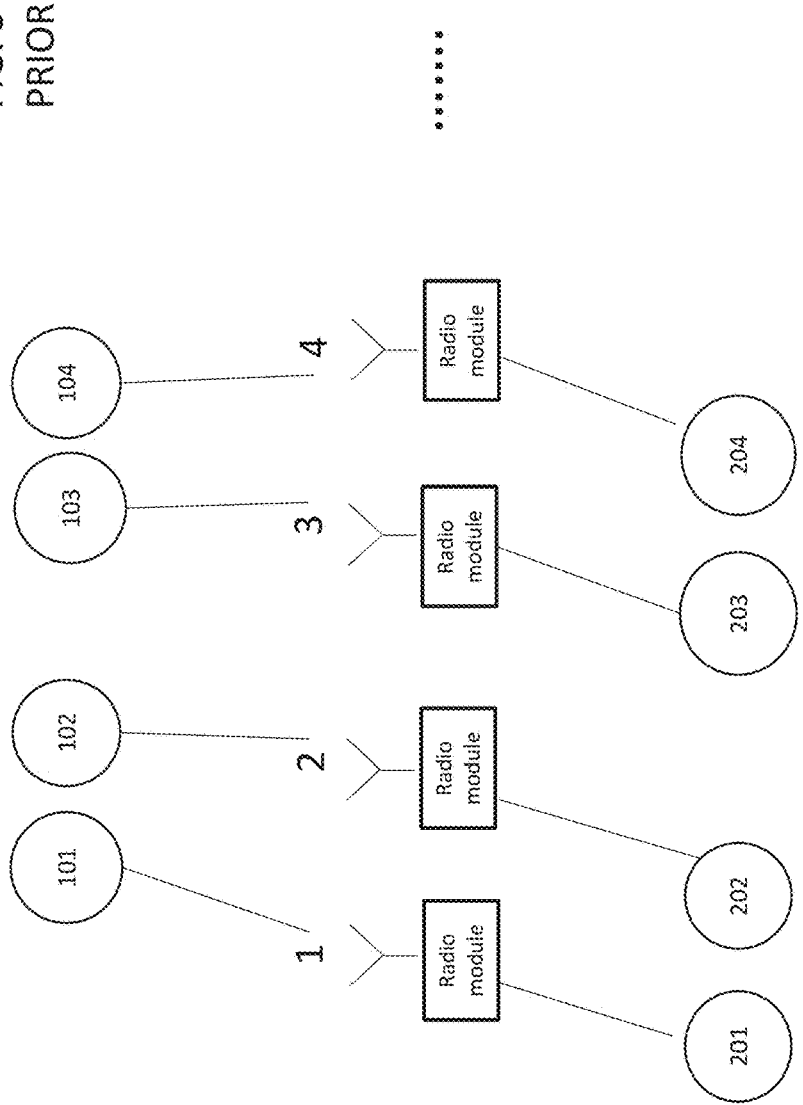

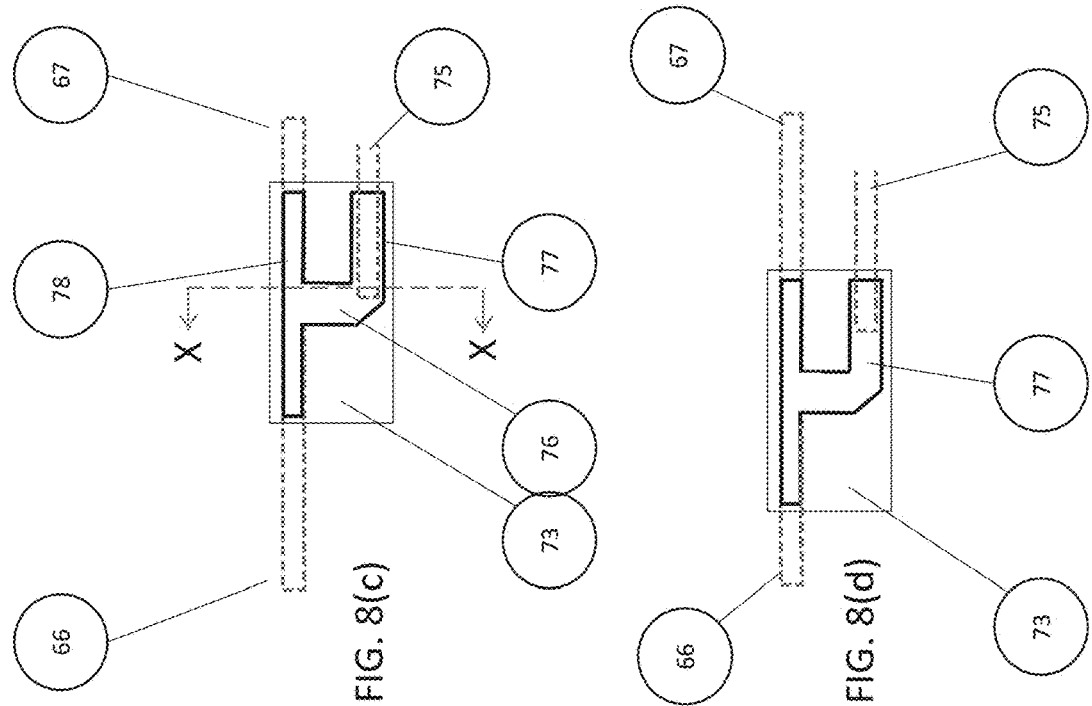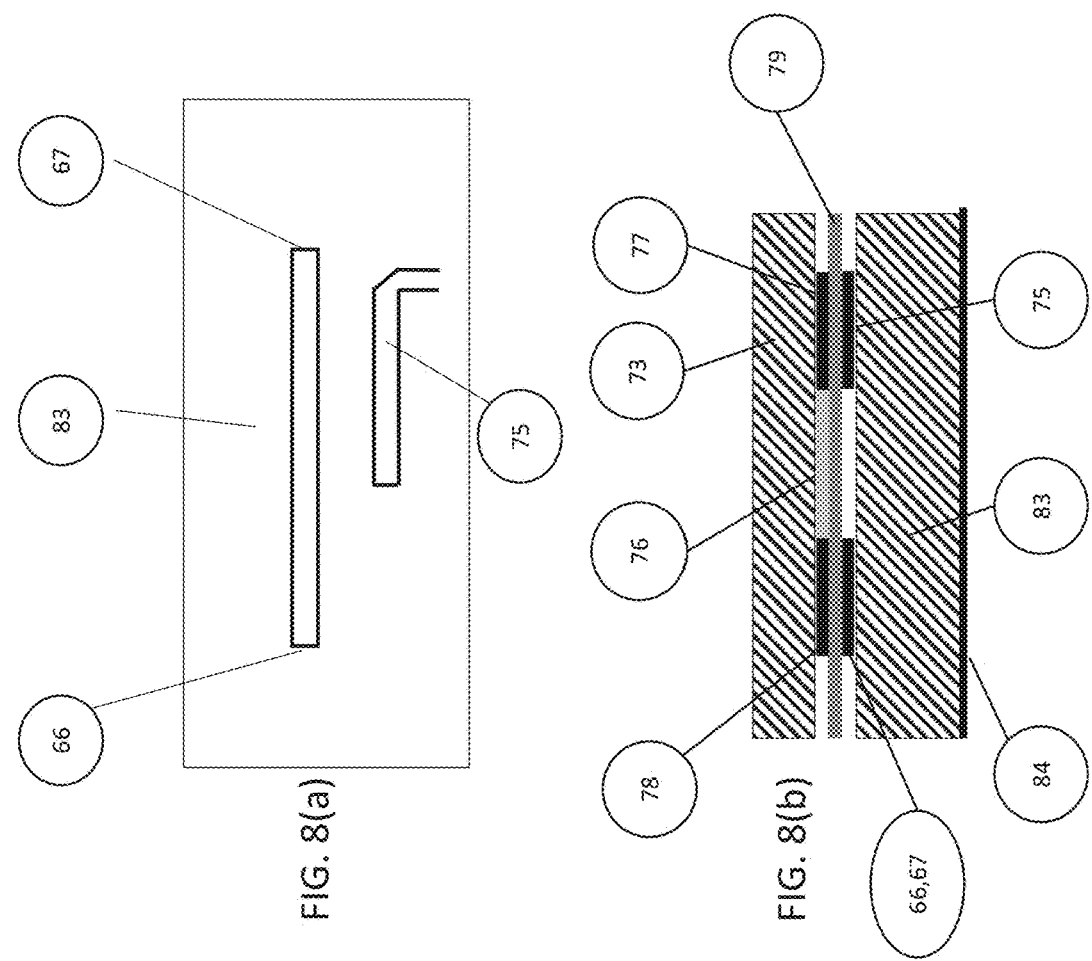

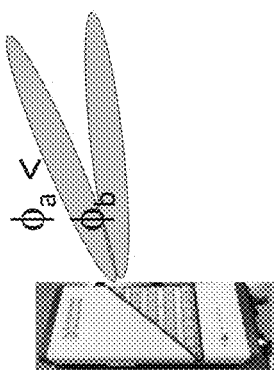
FIG. 12(c) Passive tilt +15
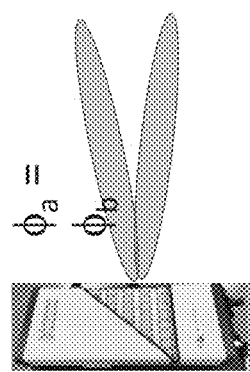
FIG. 12(b) Passive tilt 0
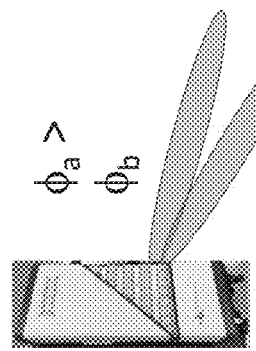
FIG. 12(a) Passive tilt -15

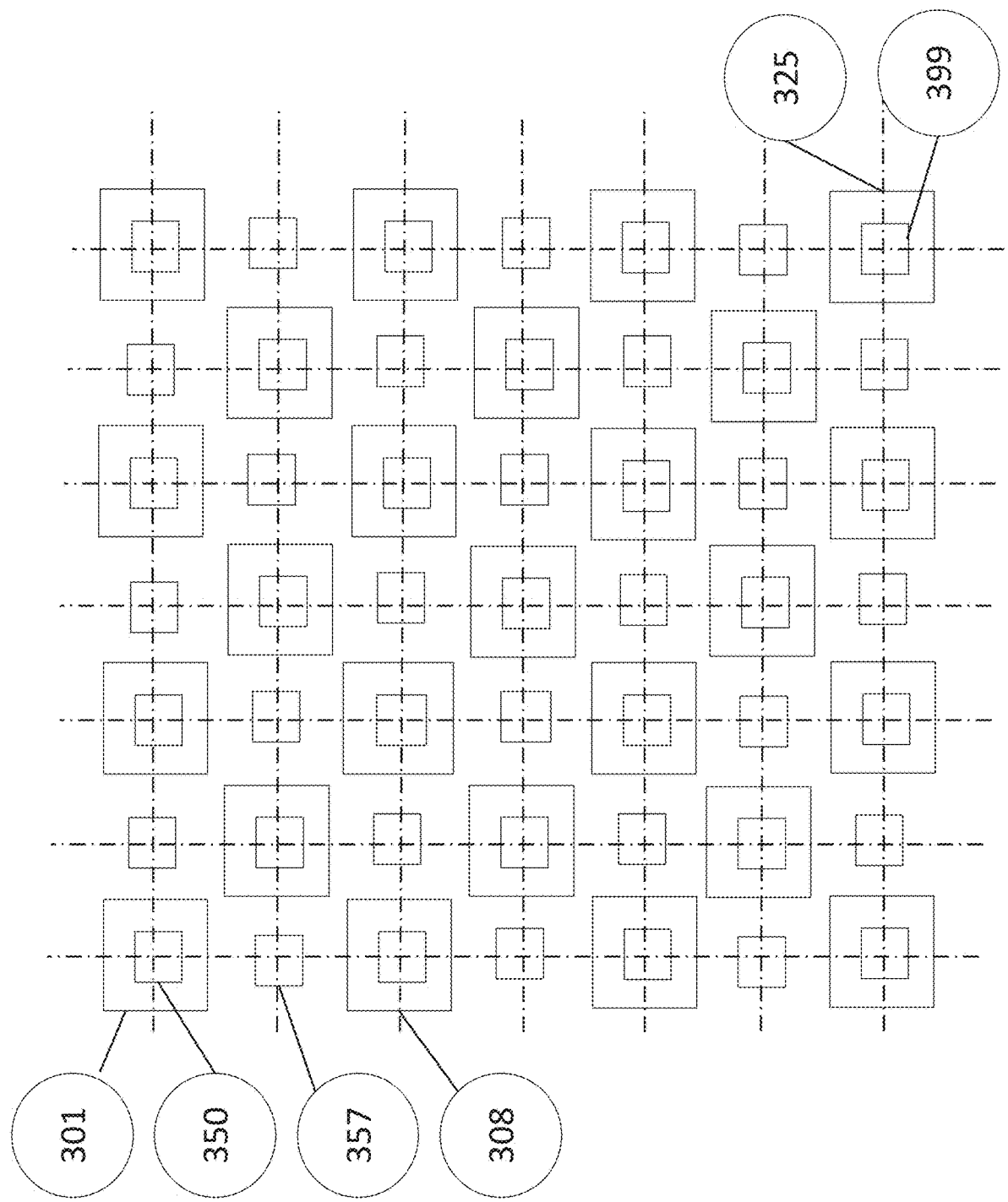

DIFFERENTIAL PHASE SHIFTER FOR HYBRID BEAMFORMING

RELATED APPLICATION

This application claims the benefit of U.S. Provisional Application No. 62/634,648, filed Feb. 23, 2018, the entire contents of which are incorporated herein by reference.

FIELD OF THE INVENTION

The invention provides an arrangement by which hybrid beamforming may be implemented at low cost to steer radiation pattern beams of a large MIMO antenna array over a wide range of angles from the mechanical boresight (axis) of the array.

BACKGROUND OF THE INVENTION

Among other innovations, modern mobile radio systems exploit the use of multiple antennas to support high data rate transmissions and to increase their spectral efficiency compared with earlier systems. Examples of such systems include those generally referred to as 4G and 5G, which may employ radio interfaces complying with the requirements of the International Telecommunications Union (ITU) IMT-Advanced Standard and IMT-2020 respectively. Systems complying with standard IEEE 802.16m are also sometimes described as 4G.

In such systems digital signal processing is employed to provide modes of operation known as MIMO (multiple-input, multiple-output). When large numbers of antennas are used, the system may be referred to as implementing massive-MIMO (mMIMO). As the present invention is most advantageously applied to simplify large arrays of antennas, the term mMIMO will be used in the following descriptions and should be understood to include any number of multiple antennas. The operation of (m)MIMO systems is further described in ETSI TR 100 311.

An mMIMO array typically comprises a large number of separate antennas, each antenna being connected to a radio module comprising electronic circuit arrangements that transmit and receive radio signals formatted in accordance with the implemented radio interface specification. An mMIMO array may comprise for example 64 antennas, mounted to form a planar array eight antennas wide and eight antennas high, facing the center of the intended geographical area of coverage. Established mobile network practice employs dual-polar antennas, so such an array would require 64 dual radio modules. The cost of each radio module may be more than 10 times greater than the cost of the associated antenna, so the cost of an mMIMO array is strongly dominated by the cost of the radio modules. Larger arrays, for example 12 antennas wide and 12 antennas high may also be required.

Among the modes of operation available to an mMIMO system are beam forming modes, and beam switching modes in which separate beams are formed towards individual users or groups of users. A base station provided with an mMIMO array may be required to form beams at a substantial angle relative to the mechanical boresight direction in the azimuth (horizontal) and elevation (vertical) planes.

The required number of radio modules may be reduced to less than of the number of antennas by a known arrangement implemented by dividing the whole array of antennas into multiple subarrays each comprising at least two antennas, providing passive phase shifters between the members of each subarray and connecting each subarray to a radio module. Such a combination of active beamforming, in which the control the amplitude and phase of antenna currents is performed by digitally controlled radio modules, together with the use of passive current control devices within subarrays, is known as hybrid beamforming (see for example Molisch et al, "Hybrid Beamforming for Massive MIMO—A Survey", IEEE Communications Magazine, Vol. 55, No. 9, September 2017.)

US 2013/0301454 A1 describes a hybrid digital—analog beamforming solution where the analog beamformer consists of phase shifters and variable power amplifiers. It further states "the analog beamformer forms beams to be transmitted in a specific direction through a plurality of phase shifters and a plurality of PAs and VGAs".

U.S. Pat. No. 6,850,130 describes a typical tapped-line phase shifter in which the relative phase shift between the ends of an arcuate transmission line is controlled by adjusting the angle of a radial input transmission line. Such arrangements have been widely used in mobile radio base station antennas.

Typical prior art arrangements are relatively complex and have significant cost. The objective of the present invention is to provide a simplified differential phase shifter arrangement at lower cost.

The maximum extent to which the beam may be steered from the boresight direction is dependent on the spacing between successive radiating elements, typically approximately one wavelength at a frequency near the upper end of the operating frequency band. For this typical inter-element spacing the maximum beam steering angle for an array 10 wavelengths long is approximately ±10 degrees from the boresight direction. At angles beyond this, the gain at beam peak falls and the level of sidelobes becomes excessive with the result that signals may be radiated into the areas served by other base stations.

The main beam of a base station antenna is typically tilted downwards, but in an environment in which there are tall buildings it may be required to tilt the antenna beam upwards to serve the upper floors of the building.

FIG. 1 shows a passive base station antenna array 1 according to prior art. This typically comprises a plurality of radiating elements fed with radio frequency currents via a power division network. The antenna array 1 is mounted on a supporting structure 2. The antenna generates a single main beam 3 at an angle 4 below the horizontal plane that creates a footprint 5 within which mobile radio services can be provided.

FIG. 2 illustrates that the coverage footprint 5 may be moved in position relative to the base station by changing the phase shift across the antenna aperture. In an mMIMO system both beams 3 and 7 having downtilt angles 4 and 6 may be created simultaneously, serving users in footprints 5 and 8 and thereby enhancing the capacity of the base station. This arrangement is a well-known method by which the capacity of a network may be increased and is commonly referred to as vertical sectorization. With the antenna array oriented with its long axis in the vertical direction the center of the service footprint remains at a constant azimuth bearing and the applied phase shift controls its radial distance from the antenna. Downtilt is achieved by progressively advancing the phases of the currents in the upper elements of the array relative to those elements in the lower elements. The phase progression may be uniform or may be chosen to provide other shaping of the elevation radiation pattern such as sidelobe suppression and null fill. According to the number of antennas in the array it may be possible to generate further separate elevation beams and corresponding further independent service area footprints.

FIG. 3 shows a prior art linear array of antennas 100 comprising a column of 12 antennas 101-112 in which each antenna is connected by a radio frequency transmission line to a radio module 201-212. Such arrays of antennas are used to provide various modes of mMIMO operation, for example as described in ETSI TR 102 311. Such arrays are sometimes referred to as active antenna arrays, but this term is also used to describe other antenna arrangements and is avoided in this description.

In such an array, the phase and amplitude of the radiating current in each antenna may be controlled by control signals that determine the gain and phase shift through each radio module. Such signals may be of digital format and may conform to a standard such as eCPRI.

The individual antennas in the array 100 of FIG. 3 are typically spaced less than one wavelength apart at the highest operating frequency. Because the amplitude and phase of the radiating currents in each antenna can be individually controlled by the corresponding connected radio unit the array is able to generate well-formed beams over a wide range of elevation angles, both above and below horizontal.

FIG. 4 shows a representation of a planar array 300 in which antennas are arranged in rows and columns to allow beamforming in both azimuth and elevation planes. In this example only two rows are shown in full, comprising antennas 101-164, each antenna being connected by a radio frequency transmission line to a corresponding radio unit 201-264.

A practical array may typically comprise 8×8, 12×12, 16×16 antennas or even more. An array of 12 rows and 12 columns comprises 144 antennas and 144 radio units. The radio units account for as much as 95% of the cost of the array, so it is highly desirable to provide an arrangement by which the essential functionality of such antenna arrays may be maintained while the cost is substantially reduced.

FIG. 5 shows a partial view of an array 100 comprising 12 antennas 101-112 in which the antennas are arranged as subarrays 121, 122, 127 each comprising two antennas and having a single connection to radio modules 201, 202, 206. In this figure the relative phase of the currents in the two members of each subarray is fixed by the chosen phase shifts created by the transmission lines 66-71 connecting each antenna to the common junction points 131, 132, 136. In such an arrangement all subarrays may be physically identical.

FIG. 6 shows a more detailed view of a subarray 60 comprising a passive power divider 61 having a fixed relative phase between its output currents and being connected by radio frequency transmission lines 66, 67 to two antennas 101, 102 and a radio module 201.

The power divider 61 may be a simple reactive power divider, a so-called Wilkinson power divider, or a hybrid junction. The power divider 61 and transmission lines 66, 67, 72 may comprise coaxial or microstrip lines. The currents delivered to the antennas 101, 102 may be of equal amplitude and have a relative phase chosen by design to correspond to the mean angle at which it is desired to form beams by the action of the active beam forming function.

This prior art arrangement is limited in its ability to form well-shaped beams over a wide range of angles in response to control signals to the radio modules because of the fixed phase relationship between the two antennas forming the subarray determined by the relative lengths of the transmission lines 66, 67 and the properties of the power divider 61. This fixed phase defines the steering angle of the radiation pattern of the subarray. When configured in an array, for example comprising six subarrays, the beam of the entire array may be steered away from this angle by controlling the gain and phase shift of the connected radio modules. However as the resulting steering angle of the array beam moves away from the steering angle of the subarrays, the gain of the whole array is reduced and the level of unwanted sidelobes becomes larger. A typical useful range of steering angles from such an array is around 5 degrees either side of the sub-array steering angle. While this limited range of beam angles may suit some deployments, other deployments may require array beams that are separated by more than ±5 degrees.

SUMMARY OF THE INVENTION

According to the present invention an array comprising a plurality of antennas is divided into a plurality of subarrays each comprising at least two antennas. The at least two antennas comprising each of the said subarrays are each connected to a variable differential passive phase shifter, and a plurality of phase shifters is operated by at least one actuator mechanism in response to a control signal which may be of digital or analog format.

BRIEF DESCRIPTION OF DRAWINGS

FIG. 3 shows a linear array of antennas each connected to a radio module.

FIG. 8(a) shows the arrangement of microstrip lines on the base dielectric of the differential phase shifter.

FIG. 8(b) shows the arrangement of microstrip lines on the moveable dielectric layer of the differential phase shifter.

FIG. 8(c) is a cross section through a differential phase shifter.

FIG. 8(d) shows the functional range of movement of the phase shifter.

FIGS. 12(a), 12(b), 12(c) each show a representation of multiple elevation beams provided by an antenna according to the present invention, indicating the sense of differential phase required between the antennas forming each subarray to form multiple beams at various elevation angles.

FIG. 17 is a diagrammatic representation of a planar array operating in at least two frequency ranges.

DETAILED DESCRIPTION OF THE INVENTION

Figure 1:
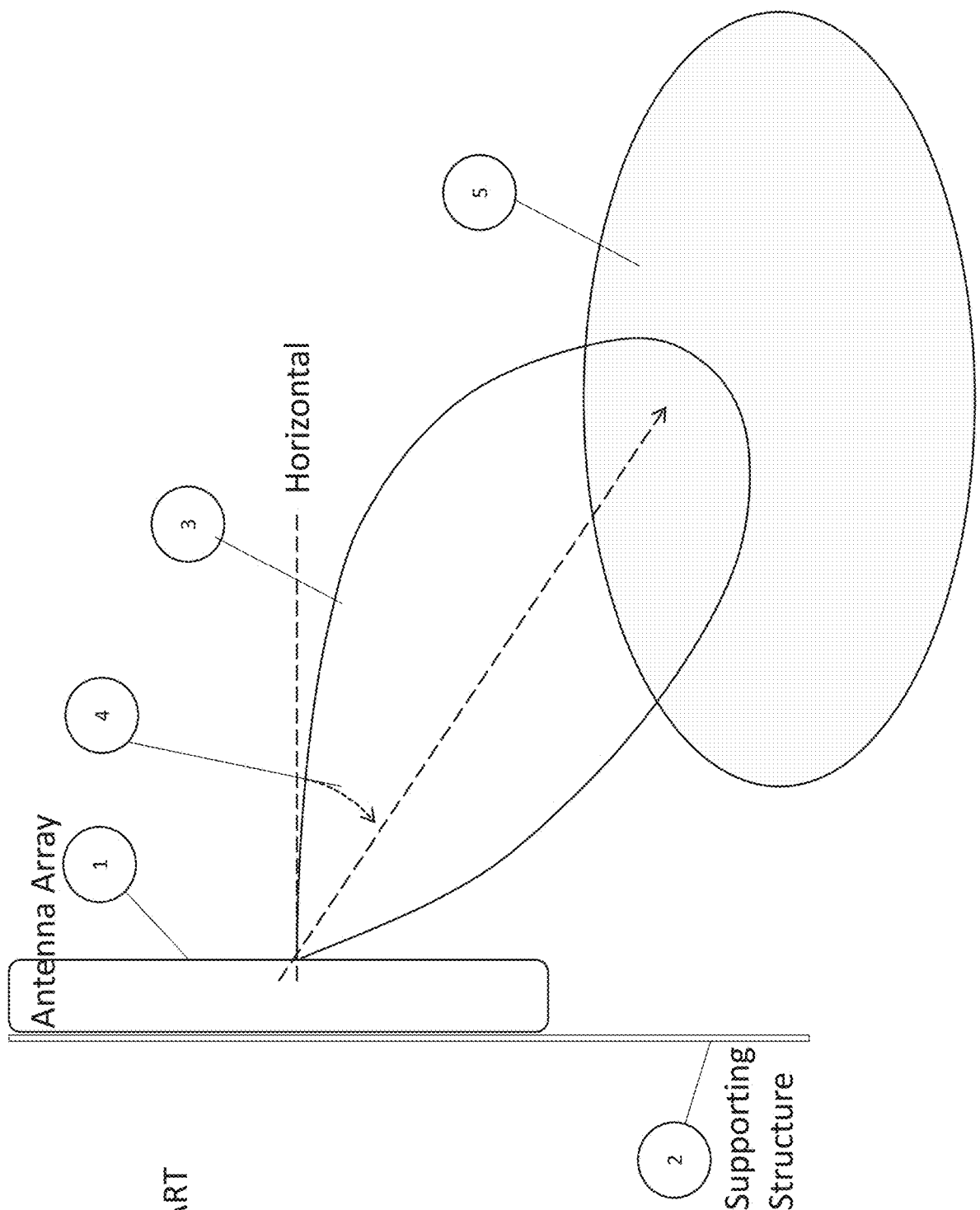
FIG. 1 shows a base station antenna according to the prior art and having a single coverage footprint.
Figure 2:
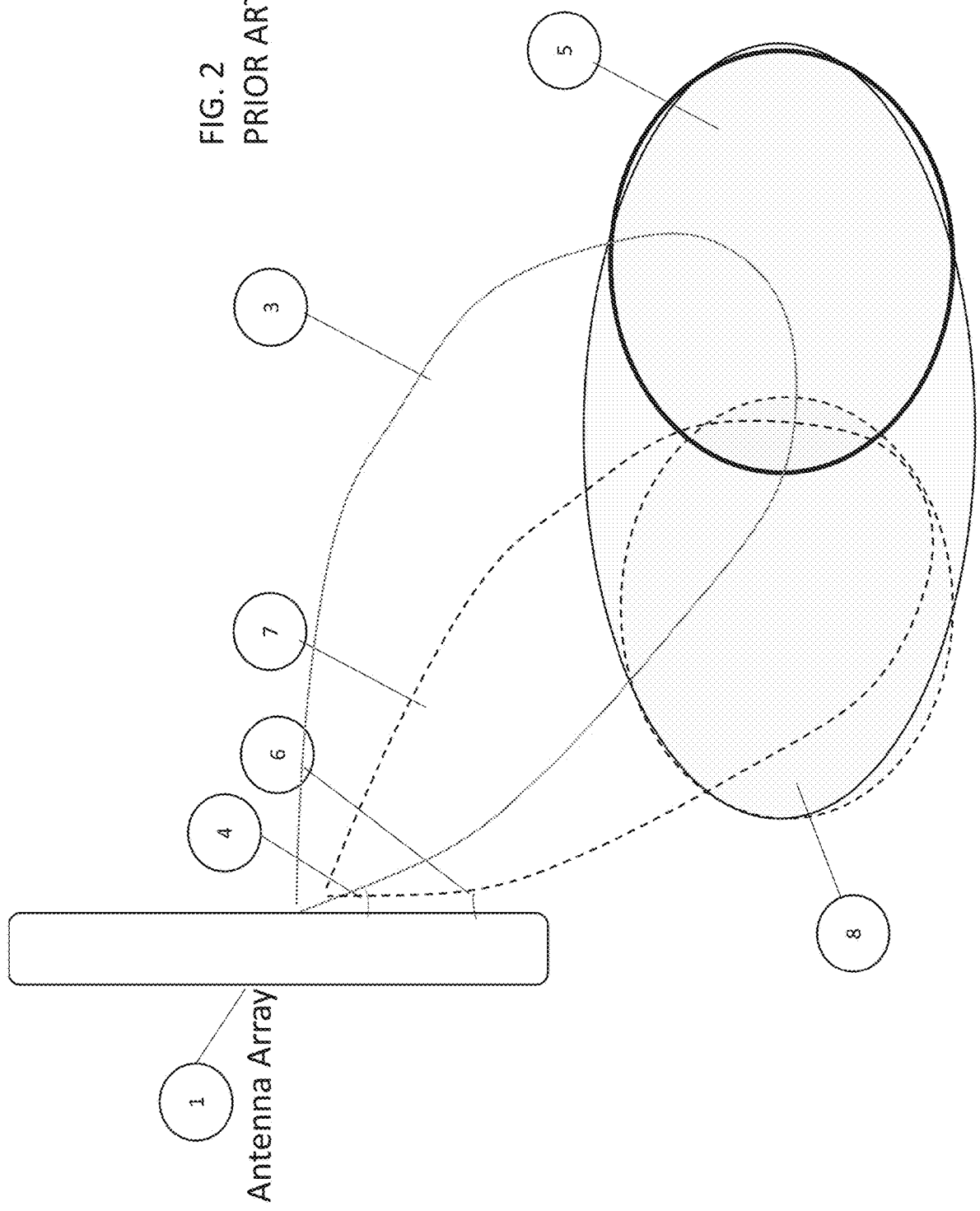
FIG. 2 shows the coverage footprint of a base station antenna with a beam adjustable in its angle of elevation and of capable of producing two separate elevation beams.
Figure 4:
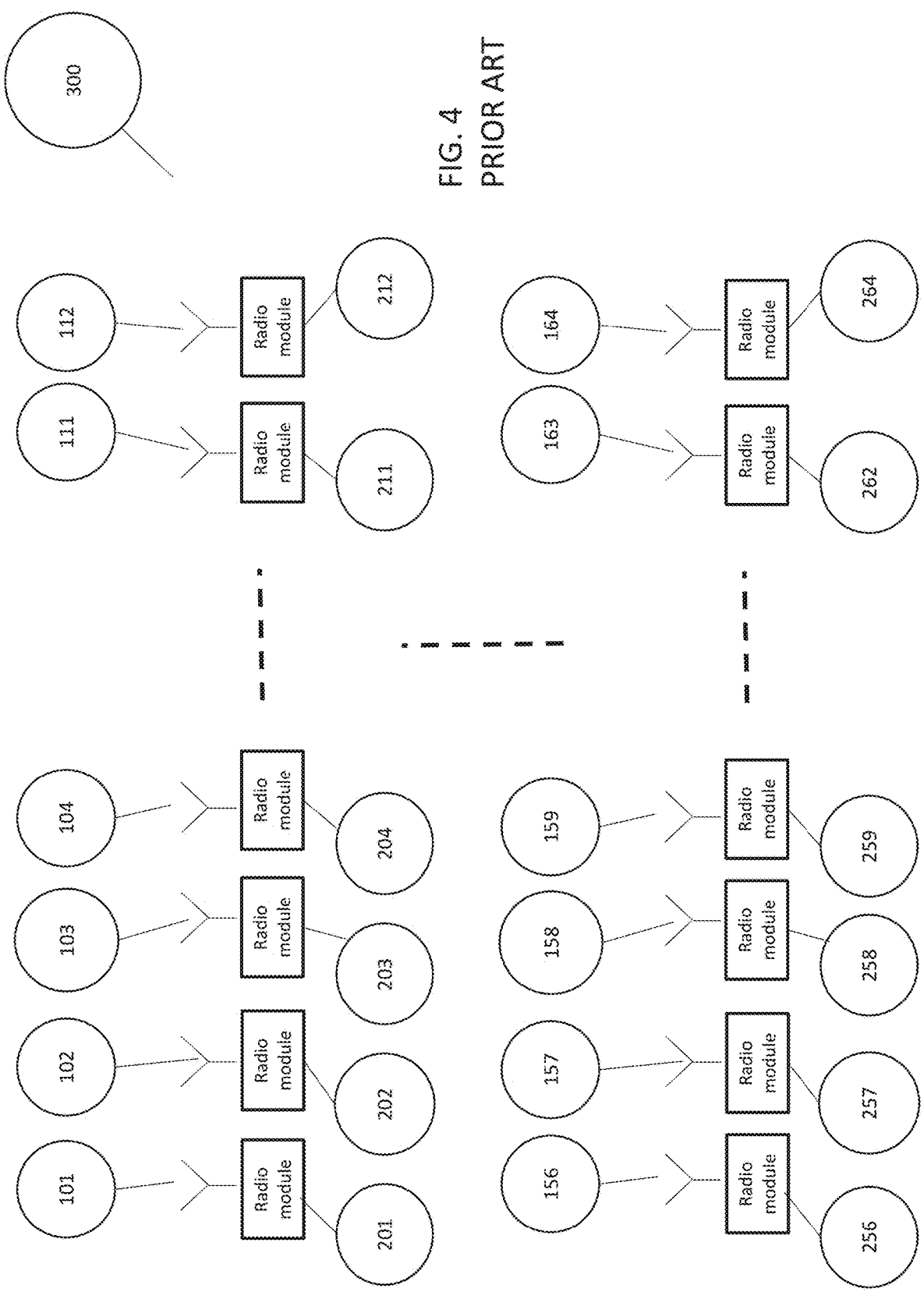
FIG. 4 shows a planar array of antennas each connected to a radio module.
Figure 5:
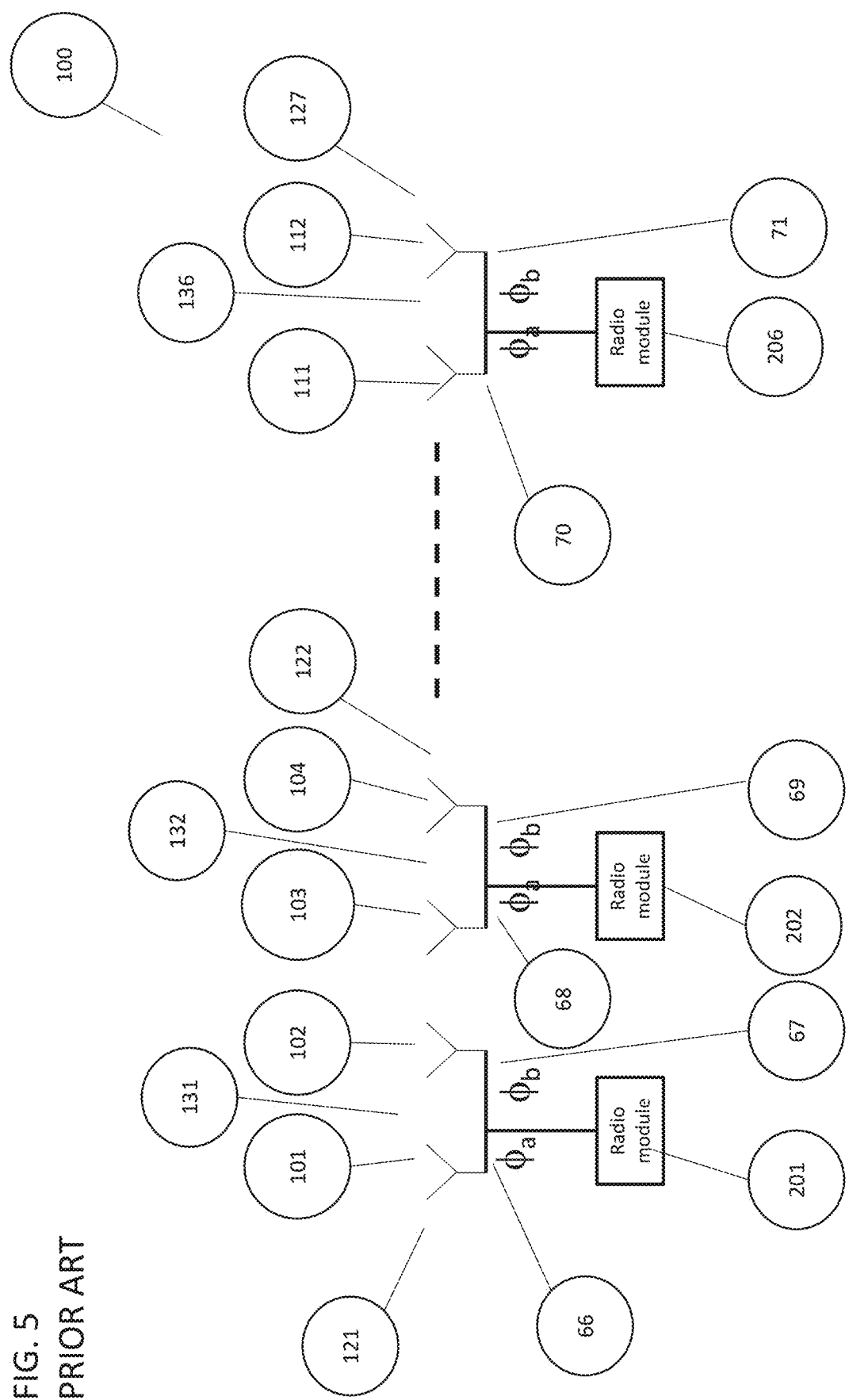
FIG. 5 shows a linear array of antennas connected in subarrays each comprising two antennas, in which the phase relationship between the antennas comprising each subarray is fixed.
Figure 6:
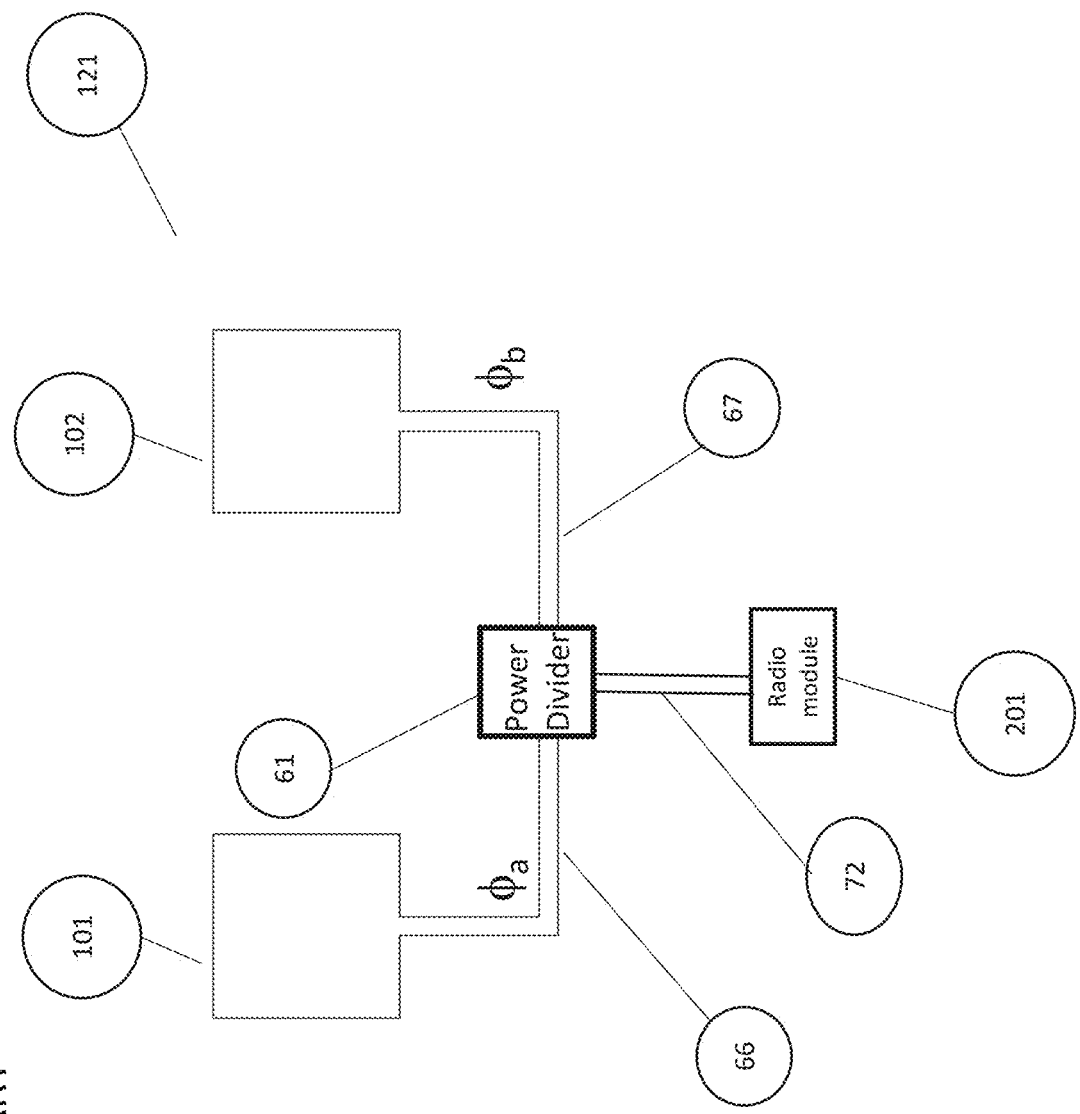
FIG. 6 shows a subarray comprising two antennas connected to a radio module by a power dividing network with outputs having a fixed phase relationship.

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

In the following descriptions it is to be understood that a passive phase shifter has identical properties in terms of phase shift whether transmitting or receiving signals. To avoid unnecessary repetition the descriptions hereafter refer to the transmission of signals but it is to be understood that they are equally applicable to the reception of signals. Active functions such as the generation of high power signals for transmission and the amplification of low-level received signals, together with filtering and digital signal processing operations are carried out in electronic circuit arrangements referred to herein as radio modules. The input signals to each module may be at radio frequency or at baseband and may include signals intended to control the amplitude and phase of the radio frequency currents fed to the antenna to which the module connected.

In the following description the application of the invention is described in terms of beams formed in the elevation radiation pattern of an mMIMO array; it is to be understood that the invention may equally be applied to beams formed in the azimuth plane, or to both.

In base station antenna implementations employing dual-polar radiating elements, such as crossed dipoles, two input connections are associated with each dual-polar antenna. For the sake of clarity the following descriptions and figures refer only to one input for each antenna. It is to be understood that in a practical implementation identical arrangements are applied for both polarizations. The radio modules referred to may be separate for each polarization or many comprise a single physical entity with two output ports to provide for both polarizations.

Although described in terms of an array operating on a single frequency band, both the antennas and the radio modules may support operation on more than one frequency hand. Such bands may be contiguous or non-contiguous in frequency. In applications where the separation between frequency bands is large the antenna may be provided with separate ports for different hands or band groups. More than 40 frequency hands are currently allocated to mobile radio services worldwide and further bands are being made available in response to the growing applications of mobile radio services.

In addition, mMIMO arrays may be configured to have different numbers of antennas in the vertical and horizontal planes. The numbers of antennas mentioned in the descriptions which follow are examples and do not constrain the application of the invention.

Figure 7A:
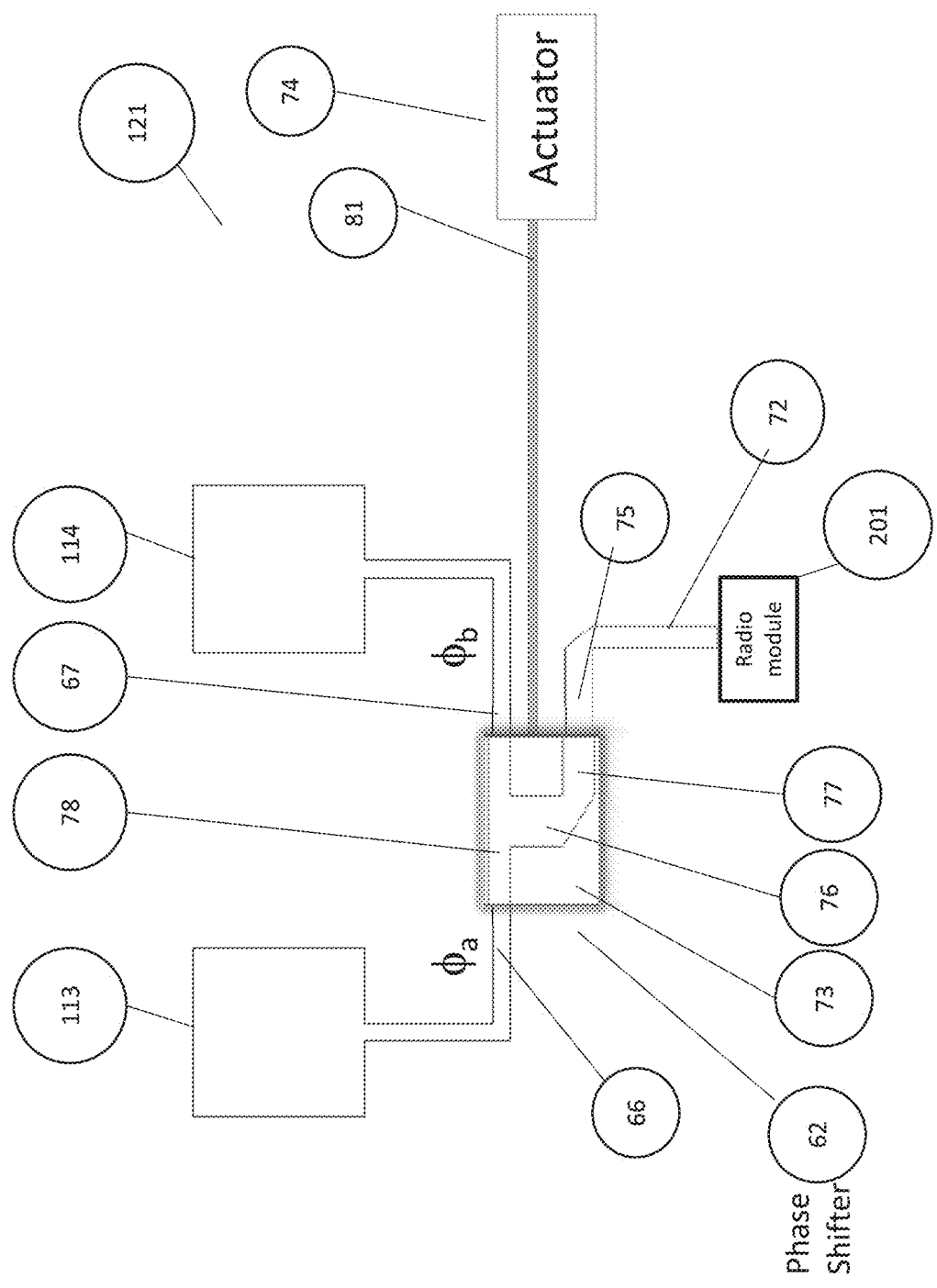
FIG. 7(a) shows a subarray comprising two antennas connected to a radio module by a variable passive differential power dividing network.

Referring to the drawings, FIG. 7(a) shows a subarray 121 according to one non-limiting example of the present invention. A radio module 201 is connected by a radio frequency transmission line 72 to the input line section 75 of a coupling element, here a passive differential phase shifter 62, constructed according to the invention. The radio module 201 comprises electronic circuits whose function is implement the bidirectional conversion and amplification between digital input signals and radio frequency signals formatted conforming to the chosen standard radio protocol. The digital signal interface to the radio module 201 may be by optical fiber and the radio frequency transmission line 72 may be implemented using microstrip or coaxial line according to the degree of integration required between the antenna and the radio module. The subarray 121 further comprises two antenna 113, 114 connected by radio frequency transmission lines 66, 67 to the phase shifter 62 which divides the signal from the radio module 201 into two and enables control of the relative phases of the currents fed to antennas 113, 114.

In one embodiment of the invention, the phase shifter 62 is constructed using microstrip technology and comprises an input transmission line 75 and output lines 66, 67 capacitively coupled by an input line 77, transverse line 76 and output line 78. Lines 76, 77, 78 are of elongate planar form, supported by dielectric lamina 73 which is operatively connected to an actuator 74 by an elongate coupling member 81. Details of the construction and operation of an embodiment of the phase shifter is described here below.

The use of a subarray having two antenna elements and a single radio module, compared with an arrangement in which each antenna is connected to a radio module, implements hybrid beamforming and reduces the number of costly radio modules by a factor of two. The arrangement does not limit the total range of angles over which the array is able to form beams, but constrains the range of angles over which beams may be concurrently formed as described here below.

Figure 7B:
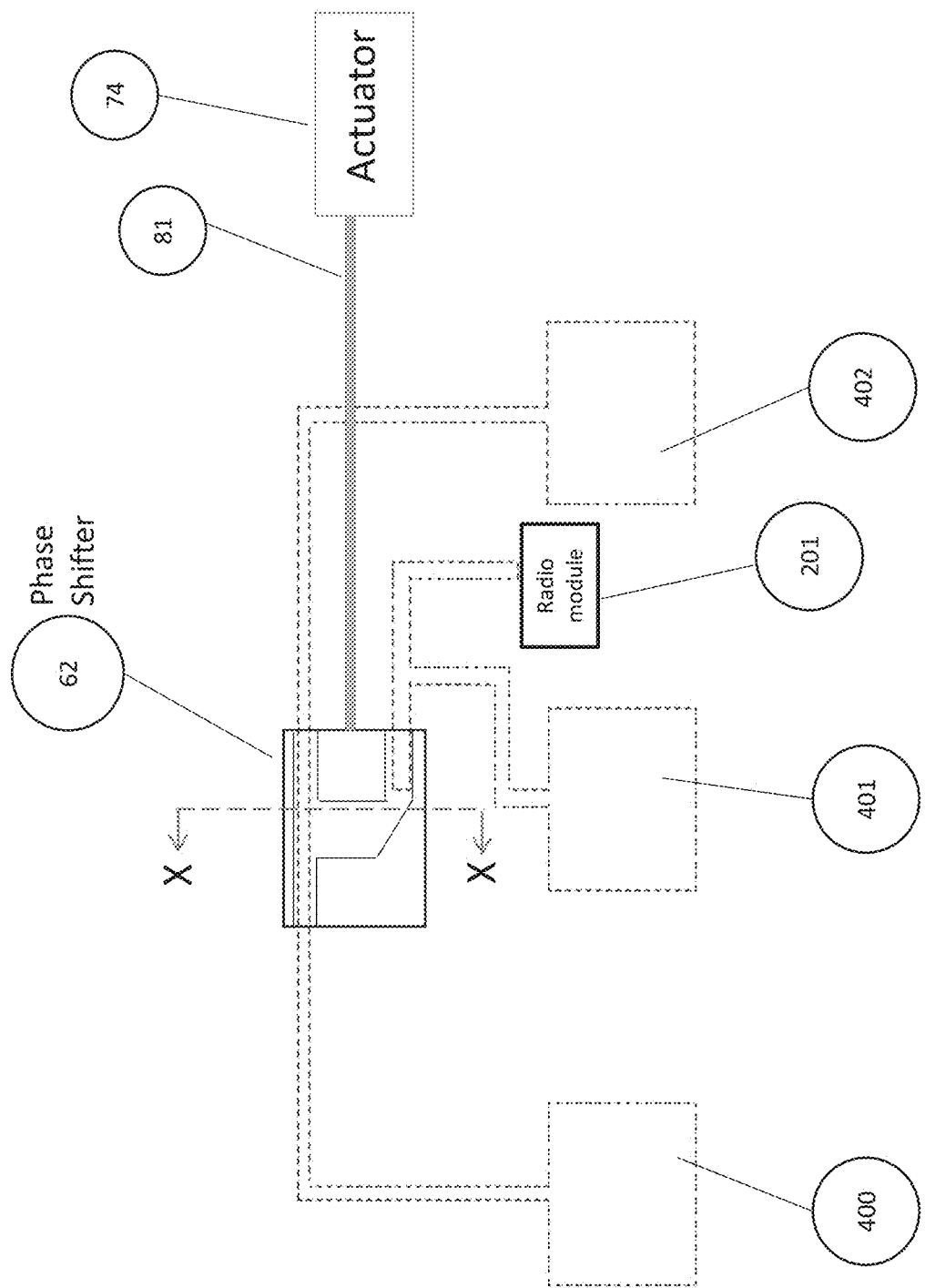
FIG. 7(b) shows another embodiment of the invention having 3 antennas connected to a radio module with the center element having a fixed phase and the 2 outer elements having a variable phase relationship.

FIG. 7(b) is another embodiment of the invention with an alternative configuration for the radio module 201 connected to three antennas 400, 401, 402 instead of two. This configuration has a fixed phase relationship on 401 and variable phase relationship on 400, 402 through a differential power divider 62.

FIG. 8(a) shows microstrip lines formed on a first dielectric lamina 83 comprising an elongate input section 75 and collinear and contiguous elongate output sections 66, 67. The output sections 66, 67 are aligned parallel with the input section 75. In one embodiment, the input section 75 can be shorter than the combined output sections 66, 67, as shown. The first dielectric lamina 83 may be extended in any direction to carry electronic circuits, antenna elements or other components. The input section 75 may be extended in any direction to connect to a radio module and the output sections 66, 67 may be extended in any direction to connect to antennas. The material of the first and second dielectric laminae 83, 73 may be chosen from any low-loss printed circuit laminate, including glass reinforced or mineral filled epoxy resin and PTFE with thickness preferably between 0.8 mm and 3 mm. The first and second dielectric laminae may be of the same or different material and thickness. The copper conductors and groundplane may preferably be between 17.5 and 105 micrometers in thickness (equivalent to between 0.5 and 3 ounces of copper per square foot of laminate) and formed by an etching process.

FIG. 8(b) shows microstrip lines formed on the second lamina 73 comprising an elongate input section 77, an elongate output section 78, substantially parallel with input section 77, and a transverse impedance transformer section 76, connecting sections 77 and 78, together forming an "h" shape, dimensioned such that spacing between the longitudinal center lines of sections 77 and 78 is the same as that between sections 75 and the collinear and contiguous sections 66 and 77.

FIG. 8(b) is a cross sectional view in direction X-X as shown on FIG. 8(c), wherein the first dielectric lamina 83 is provided with a conductive groundplane 84 on a first face and supports microstrip line sections 66, 67 and 75 on a second face. Microstrip lines 76, 77, 78 are formed on a first face of the second dielectric lamina 73 and are dimensioned such that the spacing of the longitudinal center lines of line sections 77 and 78 is equal to that between section 75 and collinear sections 76, 77 on the first lamina. The second face of the second lamina 73 has no groundplane or other conductive features. The first and second dielectric laminae 83, 73 are arranged such that the second face of the first lamina is proximal to the first face of the second lamina.

A dielectric layer 79 is juxtaposed between the proximate surfaces of the first and second dielectric laminae 73, 83 such that the proximate lines sections 75 and 77 and the proximate line sections 78 and 66, 67 are capacitively coupled and no galvanic contact is made between them. The dielectric layer 79 may take the form of a thin lamina, for example of polyimide film, or the surfaces of the proximate line sections may be provided with a wear-resistant dielectric coating, for example epoxy solder resist. The purpose of providing capacitive coupling between line sections is to avoid the generation of passive intermodulation products which are likely to be produced when radio frequency currents flow between conductive surfaces in galvanic contact, especially in cases where such surfaces have only light contact pressure to allow them to slide relative to one another.

Mechanical arrangements are provided by which lamina 73 is able to slide linearly along the axis of line sections 66, 67 while at the same time light mechanical pressure is applied to lamina 73 to maintain stable capacitance coupling between the juxtaposed line sections on the base lamina 83 and the slideably moveable lamina 73. By way of example, pressure may be applied by springs or by components made from conformable foam; alignment of the line sections may be maintained by the use of slots or guides. Still further, other suitable slideably coupling devices can be provided to slideably couple the line sections 66, 67, 75 on the base lamina 83 with the line sections 77, 78 on the moveable lamina 73.

FIG. 8(d) shows the configuration of the phase shifter when the slideably moveable lamina 73 is in a first extreme position such that the length of line section 66 is smaller than that of line section 67 and the opposing areas of line sections 75 and 77 provide just sufficient capacitance to ensure a matched impedance at the input end of section 75. By comparison, FIG. 8(c) shows the slideably moveable lamina in a second extreme position, beyond which the open circuit end of section 75 becomes exposed beyond the end of section 77. The maximum differential phase shift that can be provided is determined by the length of the input and output line sections 77, 78 expressed as a fraction of a wavelength at the operating frequency (one wavelength=360 degrees).

By way of example, a phase shifter according to the invention operating at 3.5 GHz, constructed on typical glass-PTFE laminate having a relative permittivity of 2.4 and a relative phase shift between −90 degrees and +90 degrees would require a total range of longitudinal movement of approximately 14 mm. By way of further example a phase shifter according to the invention operating at 2.44 GHz, constructed on glass-epoxy laminate with a relative permittivity of 4.0 and a relative phase shift between −120 degrees and +120 degrees would require a total range of longitudinal movement of approximately 20.5 mm. By way of example, for a subarray 212 having a distance between its constituent antennas 101, 102 of 0.6 wavelengths, the formation of a beam at an angle of 45 degrees from the direction normal to the plane of the array requires a differential phase shift of 152 degrees.

The widths of the transmission lines 66, 67, 75, together with the thickness of the dielectric lamina 83 are chosen by design to form microstrip lines with a typical characteristic impedance of 50 ohms. By way of example, for a lamina thickness of 1.6 mm, a characteristic impedance of 50 ohms is obtained using a line width of 3.3 mm.

The widths and lengths of line sections 76, 77, 78 are chosen by design to provide impedance matching at the input to the phase shifter 75 and may be determined by computer simulation, calculation and experiment. The width of line section 78 is preferably equal to or greater than the width of line sections 66, 67 and the width of line section 77 is preferably equal to or greater than that of line section 75. These dimensions co-operate to match the parallel impedance of the antennas connected to the output sections 66, 67 to the impedance of the input section 75. When both output sections 66, 67 are terminated with matched loads, the impedance at the input 75 remains substantially constant as the relative phases of the output are varied over the range determined by the extreme positions described above.

Although usually described as a differential phase shifter an important characteristic of the arrangement described is that it provides a variable time difference between the signals at the two output ports, so the phase shift is proportional to the operating frequency. In the application described this ensures that the steering angle of the subarray is frequency independent.

The actuator 74 may be controlled by digital or analog electrical signals provided by a controller or control system under digital control and may comprise a stepper motor. The controller may include, for example, a processing device that sends digital control signals to the actuator 74 to control movement of the stepper motor.

The second substrate 73 slideably and linearly moves with respect to the first substrate 83, so that the lines 76, 77, 78 slideably move along the longitudinal axis of the transmission lines 66, 67, 75. The actuator 74 can control the linear movement of the second substrate 84 through use of the elongate coupling member 81. For example, the elongate coupling member 81 can have a distal first end coupled with the proximal end of the second substrate 73 and a proximal second end coupled to the actuator 74, where the first end is opposite the second end. The coupling member 81 can be a linear solid rod or bar, though any suitable coupling member 81 can be provided and in one embodiment the rod can be several members that elongate or extend.

The phase shifter 62 may be enclosed in a housing to protect it from water ingress.

Figure 9:
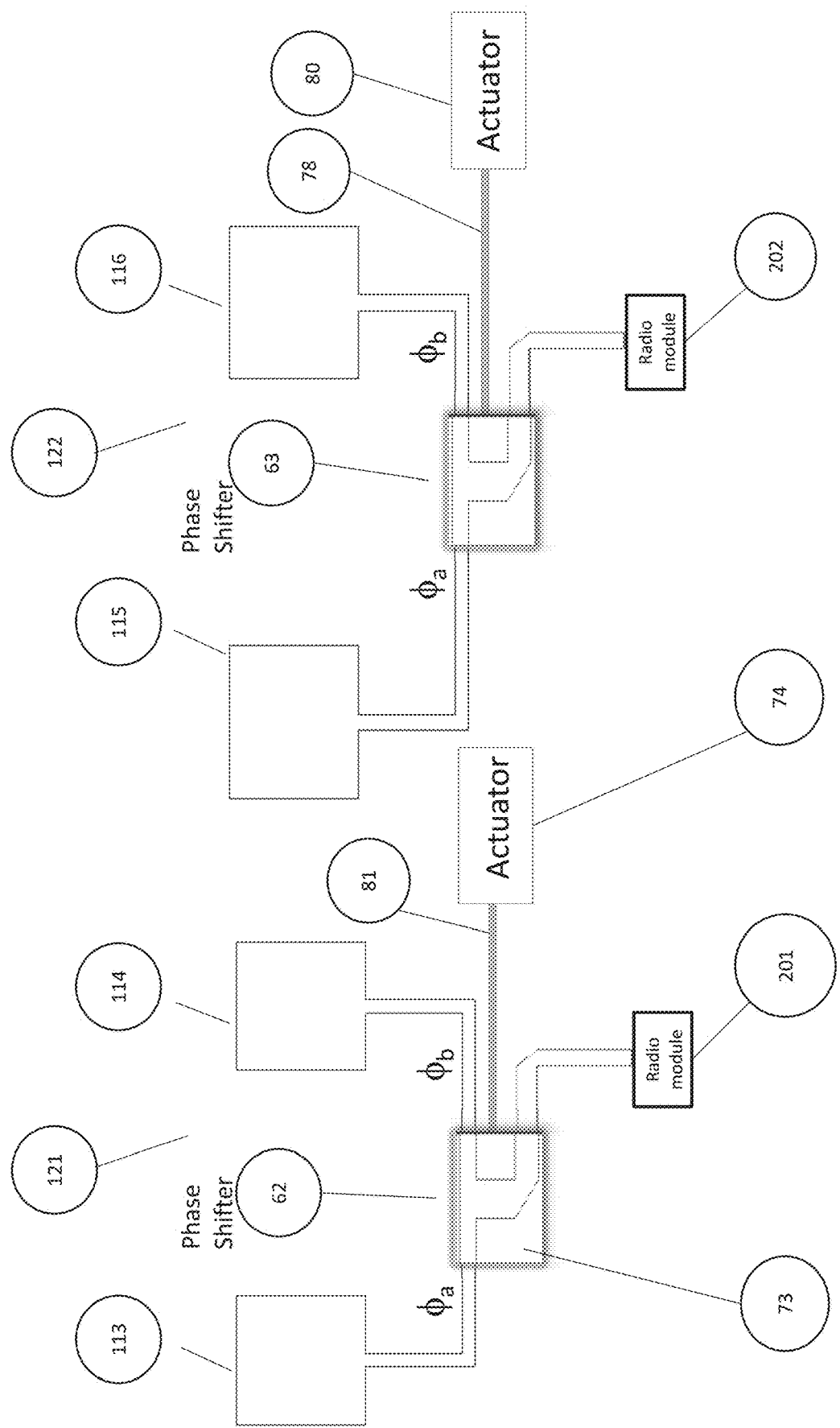
FIG. 9 shows an arrangement comprising two subarrays each fed using a differential phase shifter provided with an actuator to vary the phase relationship between currents fed to the antennas.

FIG. 9 shows an array of four antennas 113, 114, 115, 116 divided into two subarrays 121, 122 each subarray being fed by a differential phase shifter 62, 63 and connected thereby to radio modules 201 and 202 respectively. Differential phase shifters 62, 63 are operatively connected to actuators 74, 80.

Figure 10:
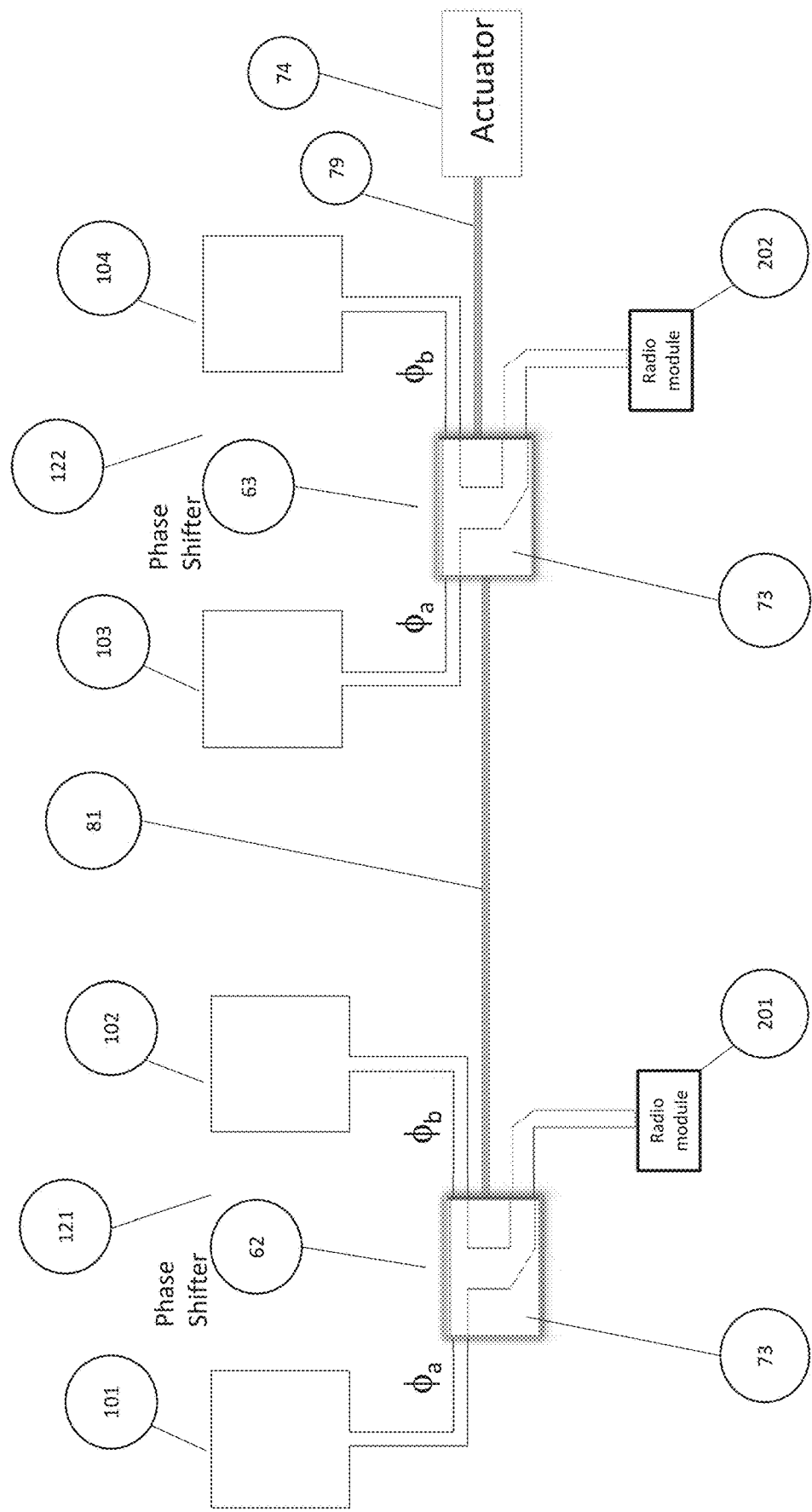
FIG. 10 shows an arrangement comprising two subarrays each fed using a differential phase shifter provided with a common actuator to concurrently vary the phase relationship between currents fed to the antennas forming each subarray.

FIG. 10 shows one embodiment in which the phase shifters 62, 63 are operatively connected to a single actuator 74 by elongate coupling members 79, 81. As shown, the second coupling member 81 can have a proximal first end coupled to the distal end of the second substrate 85 of the first subarray 63, and a distal second end coupled to the proximal end of the second substrate 73 of the second subarray 62.

To ensure that the radiation pattern of each subarray is directed at the same steering angle, the differential phase shift provided by phase shifter 62 is arranged to be the same as that provided by phase shifter 63.

The radiation pattern of the array comprising antennas 101-104 is determined by the passive phase shifts $\phi_a$, $\phi_b$ together with the relative amplitudes and phases of the currents provided by the radio modules 201, 202. These currents are controlled by control signals applied to the radio modules 201, 202 by mMIMO signal processing circuits. By combination of active and passive phase shifts the direction of the main beam of the array may be steered over a wide range of elevation angles. For any steering angle set by the passive phase shift, the array may provide one or more mMIMO beams at either side of the steering angle determined by the passive phase shift.

It will be understood that the arrangement of FIG. 10 is not restricted to the use of two subarrays, but may be extended to provide higher gain and narrower beams by the use of additional subarrays.

Figure 11C:
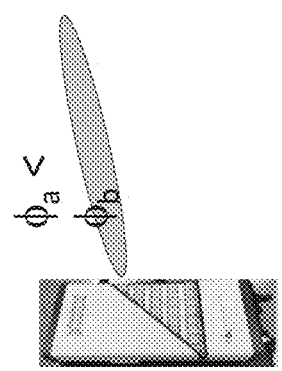
FIGS. 11(a), 11(b), 11(c) shows a representation of elevation beams provided by an antenna array, indicating the required sense of phase progression of antenna currents for beams formed at different elevation angles.
Figure 11B:
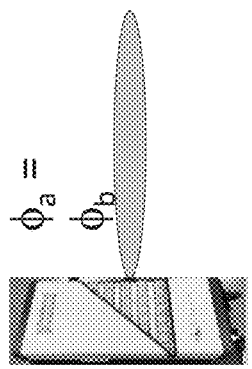
Figure 11A:
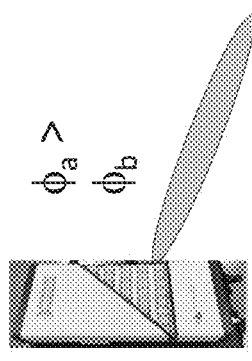

FIGS. 11(a), 11(b), 11(c) illustrate a range of beam steering angles that may be obtained from a 12-antenna vertical array comprising six subarrays each comprising two antennas as shown in FIG. 7, each subarray being provided with a passive differential phase shifter according to the invention, but without mMIMO beamforming. In FIG. 11(a), the radiation patterns are directed below the horizontal plane by the application of progressive phase shift along the whole array. The phase of the upper antenna of each subarray is advanced relative to the lower antenna, and the phases of the signals provided by the radio modules is also arranged such that the phases of the currents from the upper modules are advanced progressively up the array.

FIG. 11(b) shows a similar arrangement to that of FIG. 11(a) in which all antennas are excited by co-phased currents, with the resulting beam formed in a horizontal direction. FIG. 11(c) shows a similar arrangement to that of FIG. 11(a) in which relative phases are retarded rather than advanced, with the resulting beam formed in a direction above the horizontal plane. The formation and control of beam directions and beam shapes is well known in prior art.

FIGS. 12(a), 12(b), 12(c) indicatively illustrate a range of beam steering angles that may be obtained from a 12-antenna vertical array comprising six subarrays comprising two antennas as shown in FIG. 7 each provided with a passive differential phase shifter according to the invention and additionally employing mMIMO beamforming. For illustrative purposes only two beams are shown for each choice of passive phase shift; the number of concurrent beams that may be formed from a practical array is dependent on the capabilities of the mMIMO processing system.

In FIG. 12(a) the beam angle provided by the passive phase shifters is set to 15 degrees below the horizontal plane. In this case mMIMO beamforming allows the concurrent formation of a group of beams with directions centered around 15 degrees but typically extending from 9 degrees to 20 degrees below the horizontal plane.

In FIG. 12(b) the beam angle provided by be passive phase shifters is set to lie in the horizontal plane. In this case mMIMO beamforming allows the concurrent formation of a group of beams with directions centered around 0 degrees but typically extending from 5 degrees above to 5 degrees below the horizontal plane.

In FIG. 12(c) the beam angle provided by the passive phase shifters is set to 15 degrees above the horizontal plane. In this case mMIMO beamforming allows the concurrent formation of a group of beams with directions centered around 15 degrees but typically extending from 9 degrees to 20 degrees above the horizontal plane.

From these non-limiting examples it will be seen that the use of hybrid beamforming enabled by the passive differential phase shifters permits a mMIMO antenna system to provide beams over a wide and useful range of angles.

Figure 13:
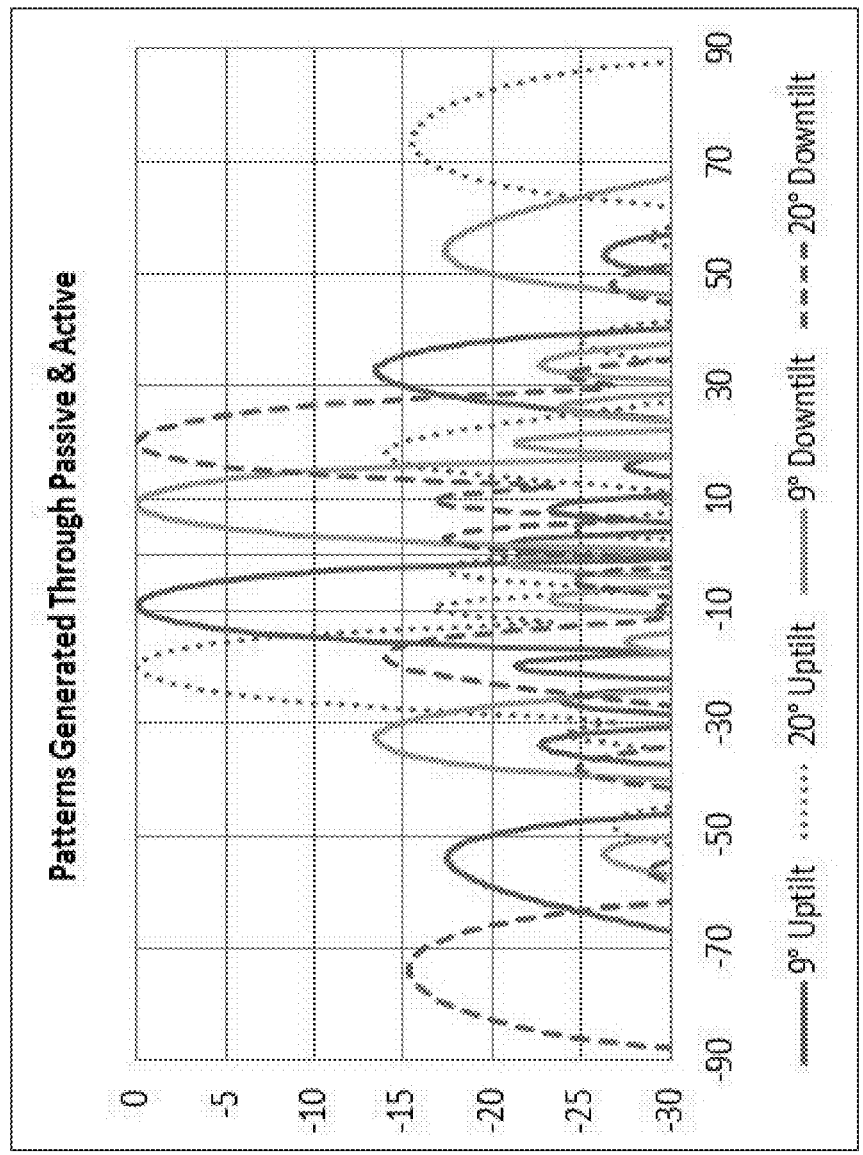
FIG. 13 illustrates typical computed elevation radiation patterns provided by an antenna according to the present invention.

FIG. 13 shows exemplary computed elevation radiation patterns for an array comprising six two-antenna subarrays with passive tilts of ±15 degrees and phase shifts applied by the radio modules to provide beams from the array steered to −20, −9, +9 and 20 degrees. This shows that despite the wide range of beam angles the beams remain well formed and the levels of sidelobes close to the main beam are well controlled.

Figure 14:
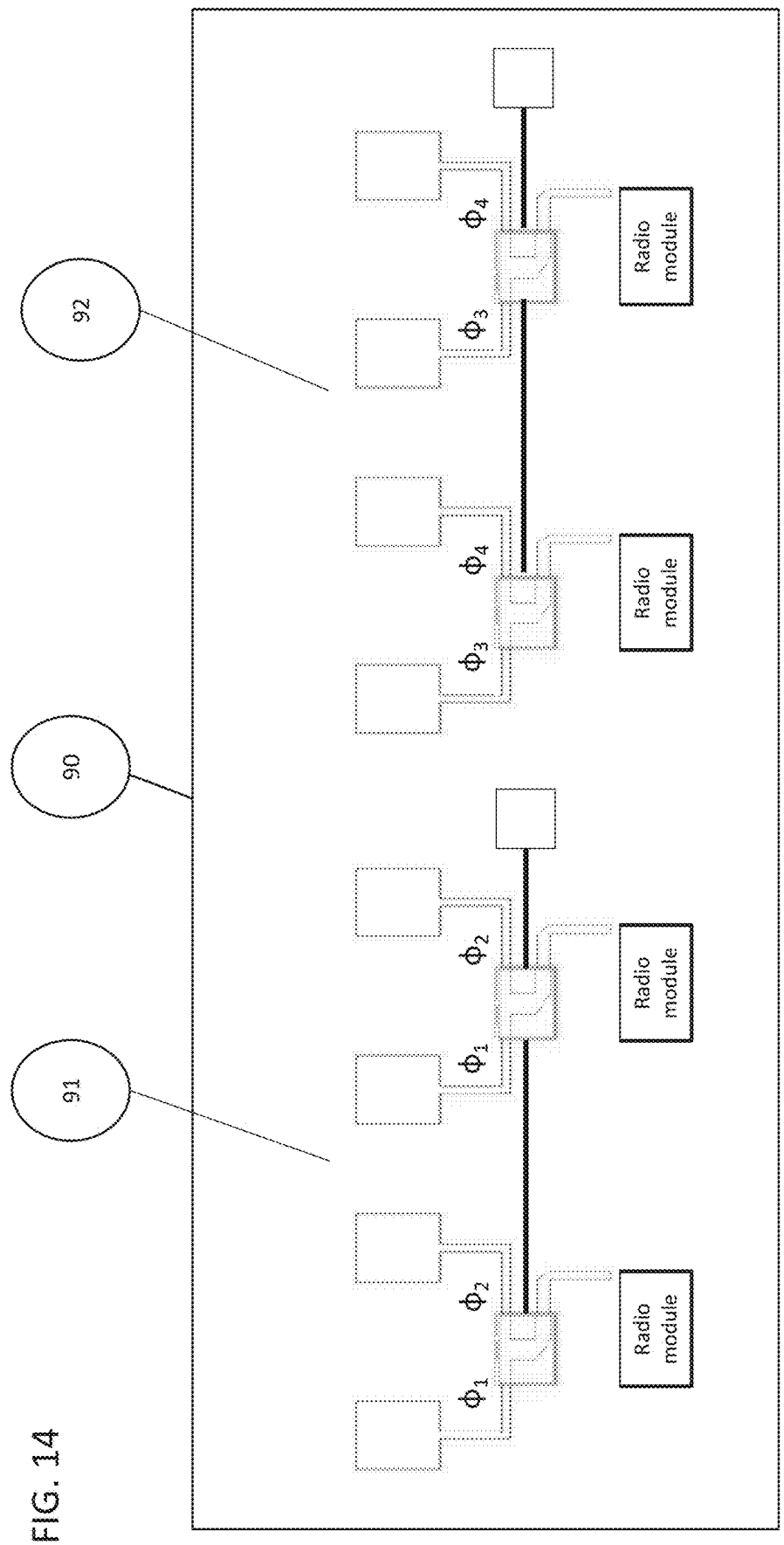
FIG. 14 shows an antenna according to the present invention in which groups of subarrays have different differential phase shifts.

FIG. 14 illustrates an application of the invention in which two arrays 91, 92 as shown in FIG. 10, each comprising a plurality of subarrays according to the present invention are constructed within a common housing 90. In this example, the control of the passive phase shifts of the arrays 91, 92 is independent, allowing the formation of two independent groups of mMIMO beams steered by different passive phase shifts. Such independent groups of beams may be concurrently steered above and below the horizontal by independent choice of the passive steering angle.

Figure 15:
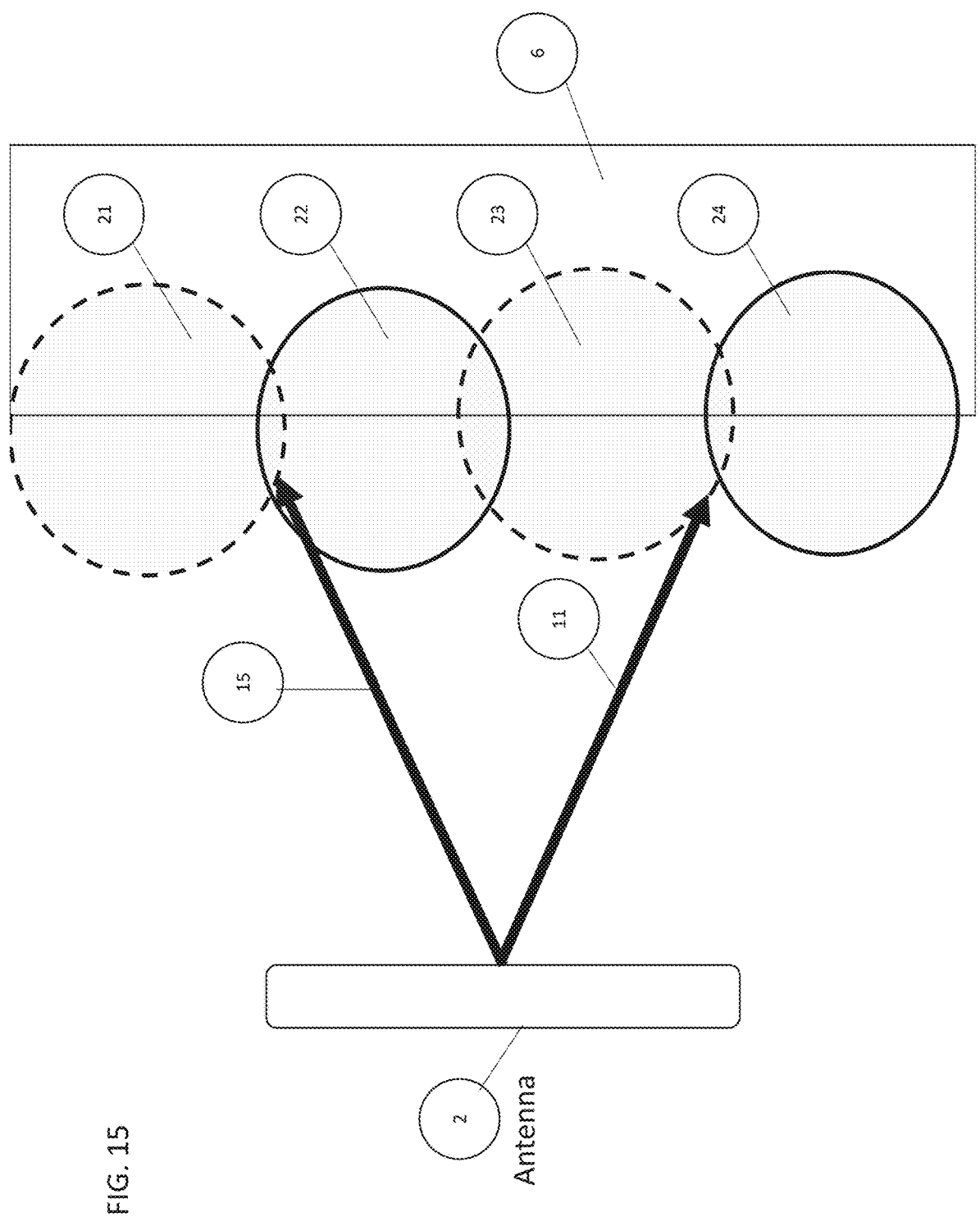
FIG. 15 shows the application of beams or groups of beams having different steering angles to provide upper and lower coverage areas on a tall building.

FIG. 15 shows an application of the invention in which an upper and a lower group of beams are steered to different elevation angles to serve a multi-story building situated close to the antenna, as may be typical of a situation in a city. An antenna 2 constructed according to FIG. 14 provides two beam groups in general directions 11 and 15, which may have downward and upward tilts respectively. An upper group of dynamic mMIMO beams such as 21, 22 serves the upper floors of the building 6 while a lower group of dynamic mMIMO beams such as 23, 24 serves the lower floors.

Figure 16:
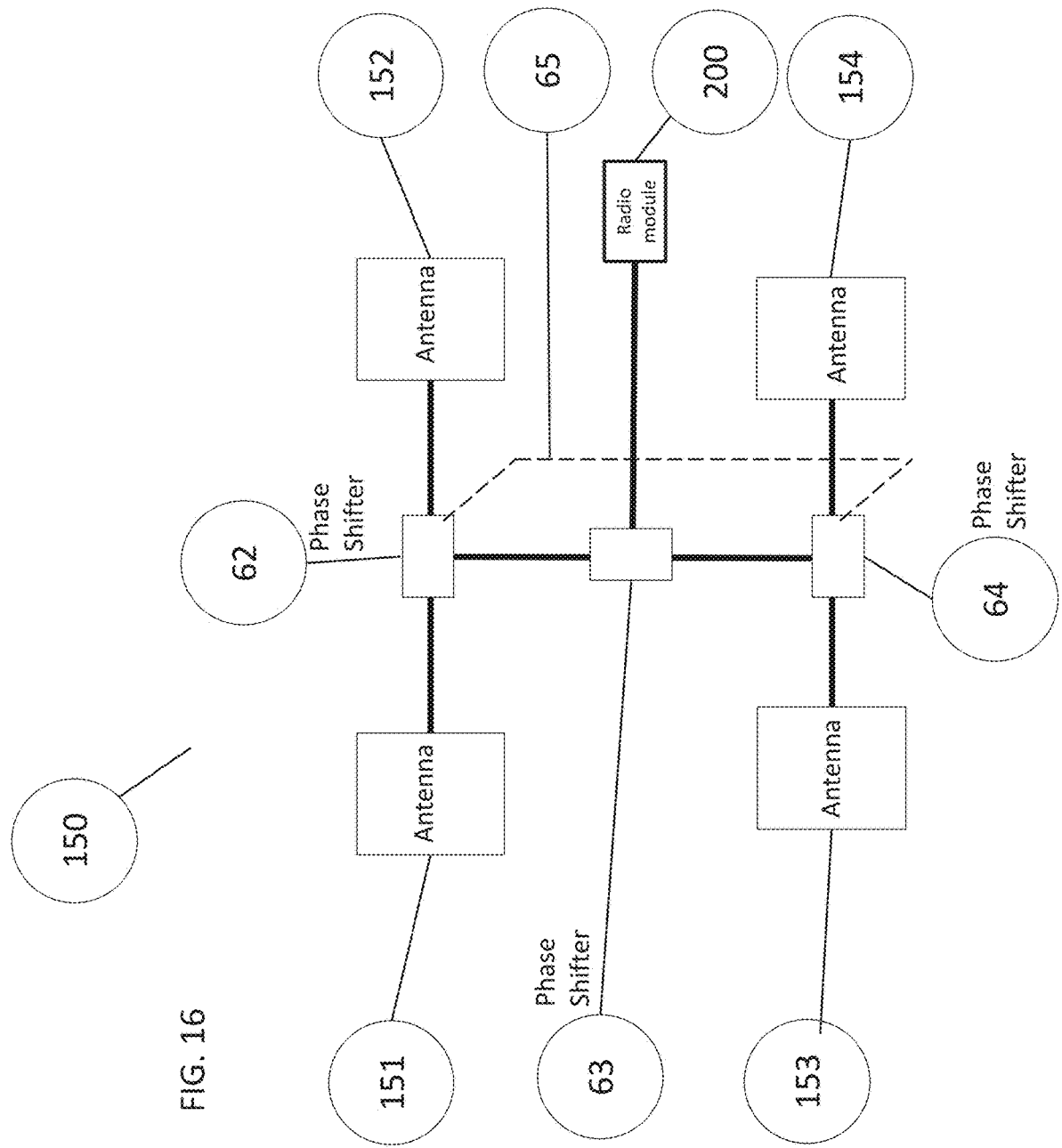
FIG. 16 shows a subarray of a planar array comprising four antennas with phase shift applied using three passive differential phase shifters.

FIG. 16 shows a further embodiment of the invention in a planar subarray 150 comprising four antennas 151-154 fed through three passive phase shifters 62, 63, 64. The signal from the radio module 200 is fed to a first differential phase shifter 63 and thence to the second and third phase shifters 62, 64. The operation of phase shifters 62 and 64 is synchronized as indicated by the dashed line 65 such that the relative phase of antennas 151, 152 is the same as that between antennas 153 and 154. With the array oriented as illustrated, that is with antennas 151, 152 forming an upper pair of antennas positioned spaced laterally and antennas 153, 154 forming a lower pair of antennas spaced laterally, this phase relationship determines the azimuth steering direction of the subarray, while the relative phase at the outputs of phase shifter 63 determines the elevation steering angle of the subarray. If the subarray is rotated by 90 degrees these functionalities are exchanged. The spacing between antennas in both vertical and horizontal planes is typically less than one wavelength at the highest operating frequency.

By combining steering in both azimuth and elevation planes the subarray steering angle can be chosen to lie in an oblique direction not lying on the principal planes of the antenna.

It will be understood that such subarrays may be combined to provide large planar arrays, For example a square array comprising 64 antennas may be formed using a 4×4 arrangement of such subarrays. This will enable the formation of a concurrent group of mMIMO beams centered on the direction, in both azimuth and elevation, in which the subarray beams are steered.

FIG. 17 shows an extension of the invention to a dual-band array in which a planar array of antennas operating at a first frequency range comprising antennas 301-325 is interleaved with a planar array of antennas 350-399 operating at a second frequency range with a frequency approximately twice that of the first array. Alternate antennas forming the second array may be substantially collocated with the antennas of the first array to form a compound dual-band element such that alternate antennas of the first array are operative in both the first frequency range and the second frequency range. This is an extension of the principle shown in WO 99/59223 from a linear array to a planar array. The antennas, which are shown diagrammatically in FIG. 17 may comprise dipoles, crossed dipoles, bent dipoles, patches or other forms of single and dual-band antennas. It is to be understood that a frequency range may encompass a plurality of contiguous or non-contiguous frequency bands assigned to mobile radio services.

The radiating elements of the first and second arrays may take to form of crossed dipoles or patches. In those locations in which there exist radiating elements that are members of both arrays, for example 301, 350, a form of radiating element is required that enables them to be collocated. Such forms are known to include stacked arrangements of patch element, arrays of dipole and crossed dipole elements and combinations of patch elements and dipole elements.

It will be obvious to those skilled in the art that this array may be divided into subarrays comprising two antennas 301, 308 operative on the first frequency range, and subarrays comprising two antennas 350, 357 on the second frequency range. Subarrays of antennas operative on a first frequency range and antennas operative on a second frequency range may be formed and fed independently, for example the subarrays of one may comprise horizontally adjacent antennas and the subarrays of the other may comprise vertically adjacent antennas or planar sub-arrays comprising four antennas forming a square. In each case the inputs to the radio units may be connected to mMIMO signal processing circuits.

The listing of specific frequency bands in both the description and claims has been common in many previous patents, but there are now more than 40 frequency bands in use worldwide, so this has become meaningless. Although the array configurations will vary, antennas designed according to the invention are suitable for use over most of the bands currently assigned to mobile radio services, the exception being bands above say 6 GHz, where alternative physical realization of the phase shifters may be necessary. The possible polarizations of antenna elements are listed, but any suitable type of elements such as crossed dipoles and patches can be utilized. The invention may be applied with any form of antenna element: dipoles, crossed dipoles, bent dipoles, curvilinear dipoles, patches and various dual-band combinations of these. All of these have one of the listed polarizations.

Within this specification, the various sizes, shapes and dimensions are approximate and exemplary to illustrate the scope of the invention and are not limiting. The sizes and the terms substantially, approximately or about mean plus or minus 15-20%, or in other embodiments plus or minus 10%, and in other embodiments plus or minus 5%, and plus or minus 1-2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

It is further noted that the description and claims use several geometric or relational terms, such as square, tapered, parallel, perpendicular, concentric, and flat. In addition, the description and claims use several directional or positioning terms and the like, such as top, bottom, distal, and proximal. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, lines may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

The foregoing description and drawings should be considered as illustrative only of the principles of the invention. The invention may be configured in a variety of shapes and sizes and is not intended to be limited by the embodiment.

Each of the exemplary embodiments described above may be realized separately or in combination with other exemplary embodiments. The statements made with respect to one embodiment apply to the other embodiments, unless otherwise specifically noted.

Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A differential phase shifter comprising:
substantially linear and parallel conductive input and output radio frequency transmission lines; and
a linearly movable transverse planar conductive coupling element configured to provide capacitive coupling between said conductive coupling element and said input and output radio frequency transmission lines, said linearly movable transverse planar conductive coupling element being linearly slideably movable along an axis of said input and output radio frequency transmission lines;
wherein said conductive input and output radio frequency transmission lines comprise a conductive input radio frequency transmission line having a distal end, and a conductive output radio frequency transmission line substantially parallel to said conductive input radio frequency, transmission lines; and wherein said movable transverse planar conductive coupling element being slideably movable along an axis of said input and output radio frequency transmission lines between a first extreme position and a second extreme position opposite the first extreme position, said movable transverse planar conductive coupling element having an elongate coupling input transmission line juxtaposed and parallel with said conductive input radio frequency transmission line, and an elongate coupling output transmission line juxtaposed and parallel with said conductive output radio frequency transmission line, and a transverse coupling transmission line connecting said elongate coupling input transmission line and said elongate coupling output transmission line, whereby said elongate coupling input transmission line remains juxtaposed with the distal end of said conductive input radio frequency transmission line at the first and second extreme positions.

2. The differential phase shifter according to claim 1, further comprising a dielectric lamina positioned between said movable transverse planar conductive coupling element and said lines to insulate said movable transverse planar conductive coupling element from galvanic contact with the input and output radio frequency transmission lines.

3. The differential phase shifter according to claim 1, further comprising a coating of dielectric material on at least said movable transverse planar conductive coupling element to insulate said movable transverse planar conductive coupling element from galvanic contact with the input and output radio frequency transmission lines.

4. The differential phase shifter according to claim 1, further comprising a coating of dielectric material on at least the input and output radio frequency transmission lines to insulate said movable transverse planar conductive coupling element from galvanic contact with the input and output radio frequency transmission lines.

5. The differential phase shifter according to claim 1, wherein said movable transverse planar conductive coupling element is operatively connected to an actuator controlled by control signals.

6. The differential phase shifter according to claim 5, wherein the control signals are derived from MIMO signal processing circuits.

7. The differential phase shifter of claim 1, wherein said movable transverse planar conductive coupling element changes the relative phase between first and second ends of said output transmission line as said movable transverse planar conductive coupling element moves along the axis of said radio frequency input and output transmission lines.

* * * * *